(12) United States Patent
Nakamura et al.

(10) Patent No.: US 10,922,330 B2
(45) Date of Patent: Feb. 16, 2021

(54) INFORMATION PROCESSING DEVICE, INFORMATION PROCESSING METHOD, PROGRAM, INFORMATION PROCESSING SYSTEM, AND CONTENT REQUESTING TERMINAL

(71) Applicant: SONY CORPORATION, Tokyo (JP)

(72) Inventors: Kentaro Nakamura, Tokyo (JP); Eiji Kamino, Tokyo (JP); Takeshi Iizuka, Tokyo (JP); Akinori Kamoda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 601 days.

(21) Appl. No.: 13/905,573

(22) Filed: May 30, 2013

(65) Prior Publication Data

US 2013/0332469 A1 Dec. 12, 2013

(30) Foreign Application Priority Data

Jun. 6, 2012 (JP) .................................. 2012128538

(51) Int. Cl.
*G06F 16/30* (2019.01)
*G06F 7/00* (2006.01)
*G06F 16/27* (2019.01)
*G06F 16/954* (2019.01)

(52) U.S. Cl.
CPC ............ *G06F 16/27* (2019.01); *G06F 16/954* (2019.01)

(58) Field of Classification Search
CPC .............................. G06F 16/27; G06F 16/954

USPC ........................................................ 707/748
See application file for complete search history.

(56) References Cited

U.S. PATENT DOCUMENTS

| | | | | |
|---|---|---|---|---|
| 7,321,858 | B2 * | 1/2008 | Andino, Jr. ............ | G06Q 10/10 705/12 |
| 8,560,398 | B1 * | 10/2013 | Gregov .................. | G06Q 30/06 705/26.2 |
| 8,805,751 | B2 * | 8/2014 | Ortiz ...................... | G06Q 30/02 706/12 |
| 8,874,574 | B2 * | 10/2014 | Purdy .............. | H04N 21/26258 707/736 |
| 2005/0273818 | A1* | 12/2005 | Kobayashi ......... | H04N 21/4668 725/46 |
| 2007/0143128 | A1* | 6/2007 | Tokarev ............. | G06Q 30/0282 705/347 |
| 2007/0143281 | A1* | 6/2007 | Smirin ................... | G06Q 30/02 |
| 2008/0114834 | A1 | 5/2008 | Miyazaki | |
| 2009/0006373 | A1* | 1/2009 | Chakrabarti .......... | G06F 16/335 |

(Continued)

FOREIGN PATENT DOCUMENTS

| | | |
|---|---|---|
| JP | 2004-127196 | 4/2004 |
| JP | 2008-123233 | 5/2008 |

(Continued)

*Primary Examiner* — Kuen S Lu
(74) *Attorney, Agent, or Firm* — Paratus Law Group, PLLC

(57) ABSTRACT

There is provided an information processing device including a recommender list obtaining unit obtaining a recommender list in which a recommender of content is associated with an evaluation score of the recommender for on a per-genre basis, a recommended content selecting unit selecting recommended content based on the recommender list, and a sending unit sending the recommended content.

22 Claims, 8 Drawing Sheets

(56) References Cited

U.S. PATENT DOCUMENTS

| | | | | |
|---|---|---|---|---|
| 2009/0125588 | A1* | 5/2009 | Black | H04L 67/306 |
| | | | | 709/204 |
| 2009/0178081 | A1* | 7/2009 | Goldenberg | G06F 3/0482 |
| | | | | 725/46 |
| 2012/0143665 | A1* | 6/2012 | Swain | G06Q 30/0239 |
| | | | | 705/14.16 |
| 2013/0227011 | A1* | 8/2013 | Sharma | G06Q 30/0241 |
| | | | | 709/204 |
| 2013/0318180 | A1* | 11/2013 | Amin | G06Q 30/0269 |
| | | | | 709/206 |

FOREIGN PATENT DOCUMENTS

| | | |
|---|---|---|
| JP | 2008-517402 | 5/2008 |
| JP | 2010-211287 | 9/2010 |
| WO | WO 2006/044939 | 4/2006 |

* cited by examiner

FIG. 2

SOCIAL GRAPH : CERTAIN USER'S SOCIAL GRAPH AGAINST USERS A TO X

| SNS USER NAME | DEGREE OF FRIENDSHIP | DEGREE OF ACQUAINTANCE | DEGREE OF FOLLOW-UP | POPULATION FLAG? | EVALUATION SCORE OF RECOMMENDER |
|---|---|---|---|---|---|
| USER A | 8 | 0 | 2 | 1 | 1.0 |
| USER B | 0 | 0 | 7 | 1 | 0.2 |
| ... | | | | | |
| USER X | 3 | 6 | 0 | 1 | 0.7 |

The degrees of friendship, acquaintanceship, and follow-up are set for each user. If user belongs to population, flag is set to "1", otherwise to "0"

Example:
User A: Friend and followed
User B: famous person and only following Twitter
User X: Company colleague and friend

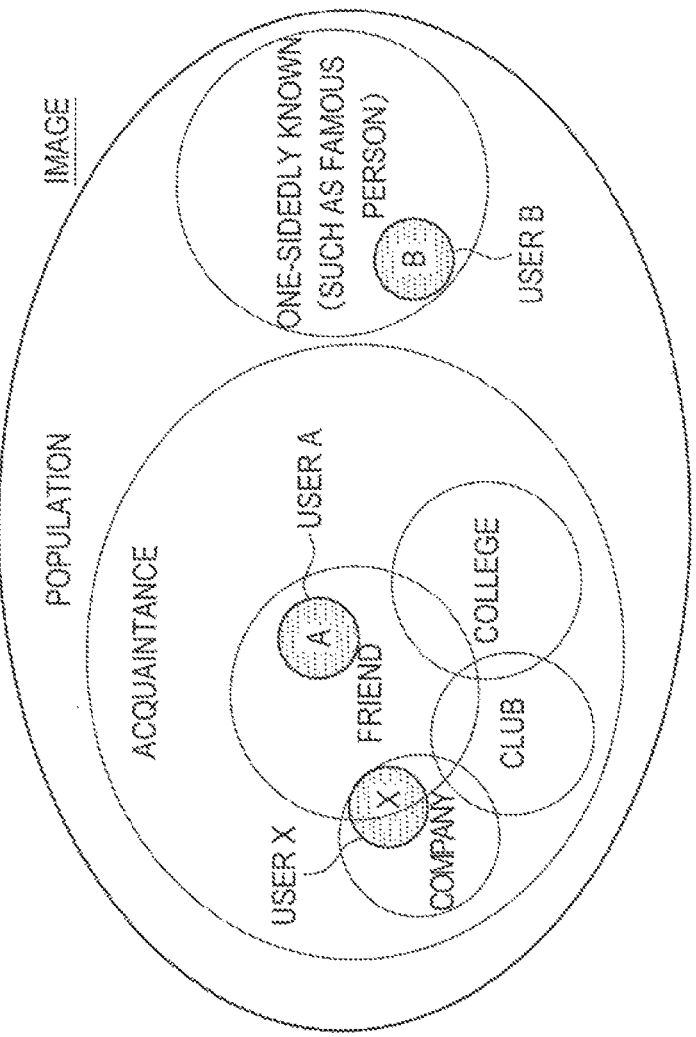

IMAGE

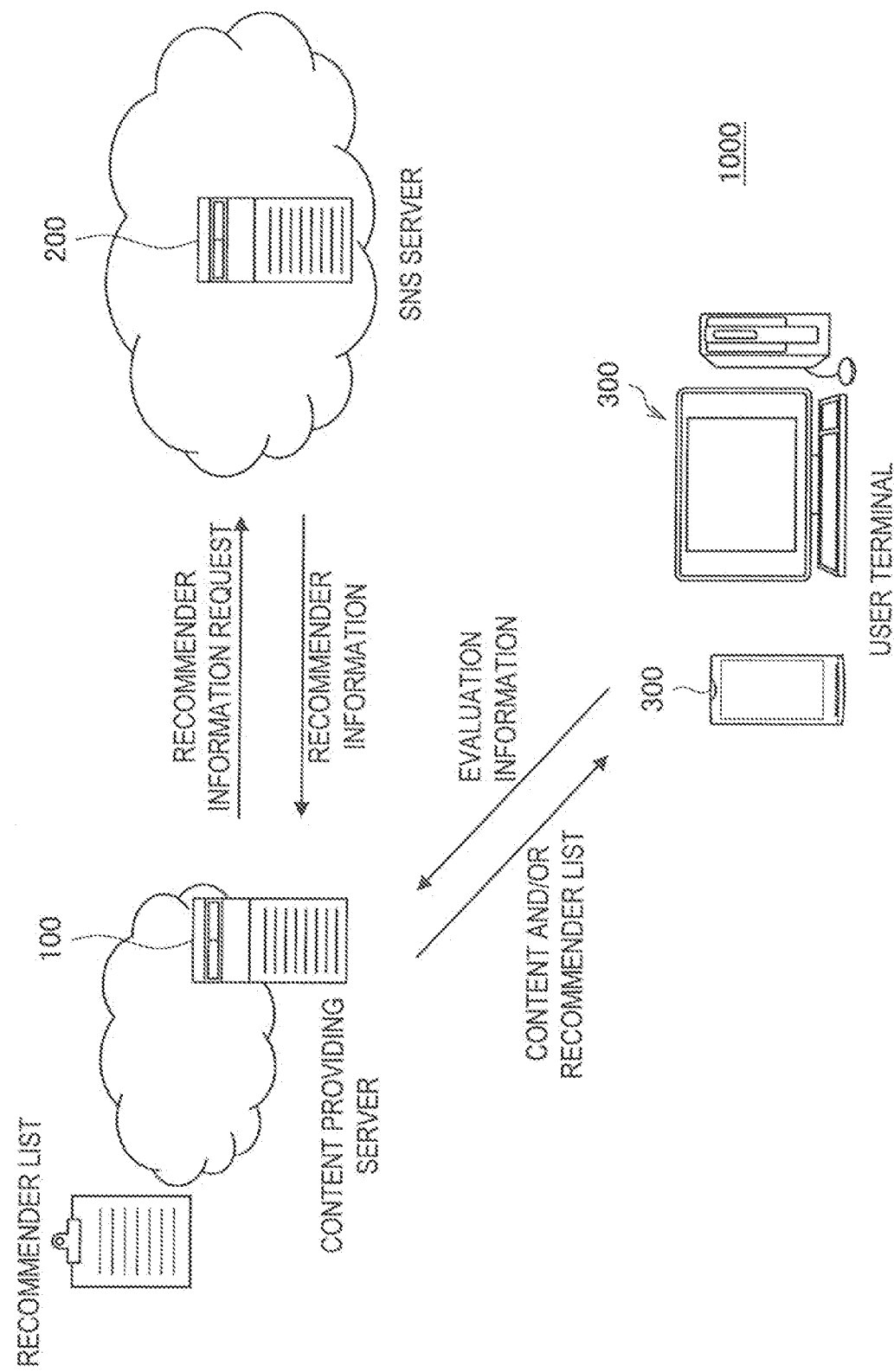

FIG. 6

GENRE: MOVIE

| SNS USER NAME | EVALUATION SCORE OF RECOMMENDER |
|---|---|
| USER A | 1.0 |
| USER B | 0.2 |
| ⋮ | |
| USER X | 0.7 |

GENRE: MUSIC

| SNS USER NAME | EVALUATION SCORE OF RECOMMENDER |
|---|---|
| USER A | 0 |
| USER B | 1 |
| ⋮ | |
| USER X | 1 |

INFORMATION PROCESSING DEVICE, INFORMATION PROCESSING METHOD, PROGRAM, INFORMATION PROCESSING SYSTEM, AND CONTENT REQUESTING TERMINAL

BACKGROUND

The present disclosure relates to an information processing device, an information processing method, a program, an information processing system, and a content requesting terminal.

Recently, social sites are widely used such as social networking service (also referred to as SNS or social media service). Also, other services are known that estimates purchaser's preference from his/her buying history and recommends and provides content.

Against this background, Japanese Patent Laid-Open No. 2010-211287 discloses a technology that aims at implementing common experience via communication media between users interested in the same media content. Japanese Patent Laid-Open No. 2008-123233 discloses another technology that aims at, while a user is using a terminal, finding other users having interest analogous to that of the user, without the user being aware of it.

Also, Japanese Patent Laid-Open No. 2004-127196 discloses a technology that aims at sharing multimedia data such as music content between a few users that can be considered as being in a range of personal use. Further, Japanese Patent Laid-Open No. 2008-517402 discloses a technology that aims at appropriately analyzing the relationship between users based on their email transmission and reception history.

SUMMARY

However, the above technique that aims at estimating purchaser's preference from his/her buying history has a problem that: since services can only be provided that relies on the buying history, recommended content might be limited. Furthermore, even for providing a user content recommended by another user, if the preference of the user given the recommendation is different from that of the recommending user, it is difficult for the former user to obtain desired content. Thus, it is difficult for the above related arts to accurately provide content that a user desires to obtain.

Therefore, it is necessary to accurately provide content that a user desires to obtain.

According to an embodiment of the present disclosure, there is provided an information processing device including a recommender list obtaining unit obtaining a recommender list in which a recommender of content is associated with an evaluation score of the recommender for on a per-genre basis, a recommended content selecting unit selecting recommended content based on the recommender list, and a sending unit sending the recommended content.

Further, the sending unit may send the recommender list along with the recommended content.

Further, the information processing device may further include a receiving unit receiving an evaluation score of the recommended content from a user having used the recommended content, and an evaluation score updating unit updating the evaluation score of the recommender list based on the evaluation score.

Further, the recommender list obtaining unit may obtain the recommender list based on population information obtained from a population forming server forming a population, the information including content recommended by each user.

Further, the population forming server may be a social network serve forming a population from acquaintance relationship between registered users.

Further, the recommended content selecting unit may select the recommended content based on recommendation of a recommender having the evaluation score equal to or more than a predetermined threshold among recommenders listed in the recommender list.

Further, the recommended content selecting unit may select the recommended content based on recommendation of a recommender weighted by the evaluation score of the recommender list.

According to an embodiment of the present disclosure, there is provided an information processing method, including obtaining a recommender list in which a recommender of content is associated with an evaluation score of the recommender on a per-genre basis, selecting recommended content based on the recommender list, and sending the recommended content.

According to an embodiment of the present disclosure, there is provided a program for causing a computer to function as a mechanism obtaining a recommender list in which a recommender of content is associated with an evaluation score of the recommender on a per-genre basis, a mechanism selecting recommended content based on the recommender list, and a mechanism sending the recommended content.

According to an embodiment of the present disclosure, there is provided an information processing system including a content requesting terminal sending a content request, a population forming server forming a population and collecting information of users belonging to the population, and a content providing device including a recommender list obtaining unit obtaining, from the population forming server, a recommender list in which a recommender of content is associated with an evaluation score of the recommender on a per-genre basis, a recommended content selecting unit selecting recommended content based on the content request received from the content requesting terminal and the recommender list, and a sending unit sending the recommended content to the content requesting terminal.

Further, the content requesting terminal may further include e a display unit displaying information of a recommender having recommended the recommended content along with the recommended content.

Further, the display unit may display the information of the recommender in different ways depending on a degree of friendship.

Further, the content providing device may further include a receiving unit receiving an evaluation score of the recommended content from the content requesting terminal, and an evaluation score updating unit updating the evaluation score of the recommender list based on the evaluation score.

According to an embodiment of the present disclosure, there is provided an information processing method including sending, by a content requesting terminal, a content request, forming, by a population forming server, a population and collecting, by the population forming server, information of users belonging to the population, obtaining, by a content providing device, from the population forming server, a recommender list in which a recommender of content is associated with an evaluation score of the recommender on a per-content genre basis, selecting, by the content providing device, a recommended content based on the content request and the recommender list, and sending, by the content providing device, the recommended content to the content requesting terminal.

Further, the information processing method may further include receiving, by the content providing device, an evaluation score of the recommended content from the content requesting terminal, and updating, by the content providing device, the evaluation score of the recommender list based on the evaluation score.

According to an embodiment of the present disclosure, there is provided a content requesting terminal including a sending unit sending a content request, a recommended content obtaining unit obtaining, from a content providing server, recommended content selected based on the content request and a recommender list in which a recommender of content is associated with an evaluation score of the recommender on a per-genre basis, and a display unit displaying the recommended content.

Further, the display unit may display information of a recommender having recommended the recommended content along with the recommended content.

Further, the content requesting terminal may further include an evaluation score sending unit sending an evaluation score associated with the recommended content.

Further, according to an embodiment of the present disclosure, there is provided an information processing method including sending a content request, obtaining, from a content providing server, recommended content selected based on the content request and a recommender list in which a recommender of content is associated with an evaluation score of the recommender on a per-genre basis, and displaying the recommended content.

Further, according to an embodiment of the present disclosure, there is provided a program for causing a computer to function as a mechanism sending a content request, a mechanism obtaining, from a content providing server, recommended content selected based on the content request and a recommender list in which a recommender of content is associated with an evaluation score of the recommender on a per-genre basis, and a mechanism displaying the recommended content.

According to an embodiment of the present disclosure, content can be accurately provided that a user desires to obtain.

BRIEF DESCRIPTION OF THE DRAWINGS

FIG. 2 is a schematic diagram showing an exemplary data configuration of a social graph for each user belonging to a group illustrated in FIG. 1;

FIG. 3 is a schematic diagram showing a system configuration according to an embodiment of the present disclosure;

FIG. 6 is a schematic diagram showing an example of listing of recommender evaluation scores per genre;

DETAILED DESCRIPTION OF THE EMBODIMENTS

Figure 1:
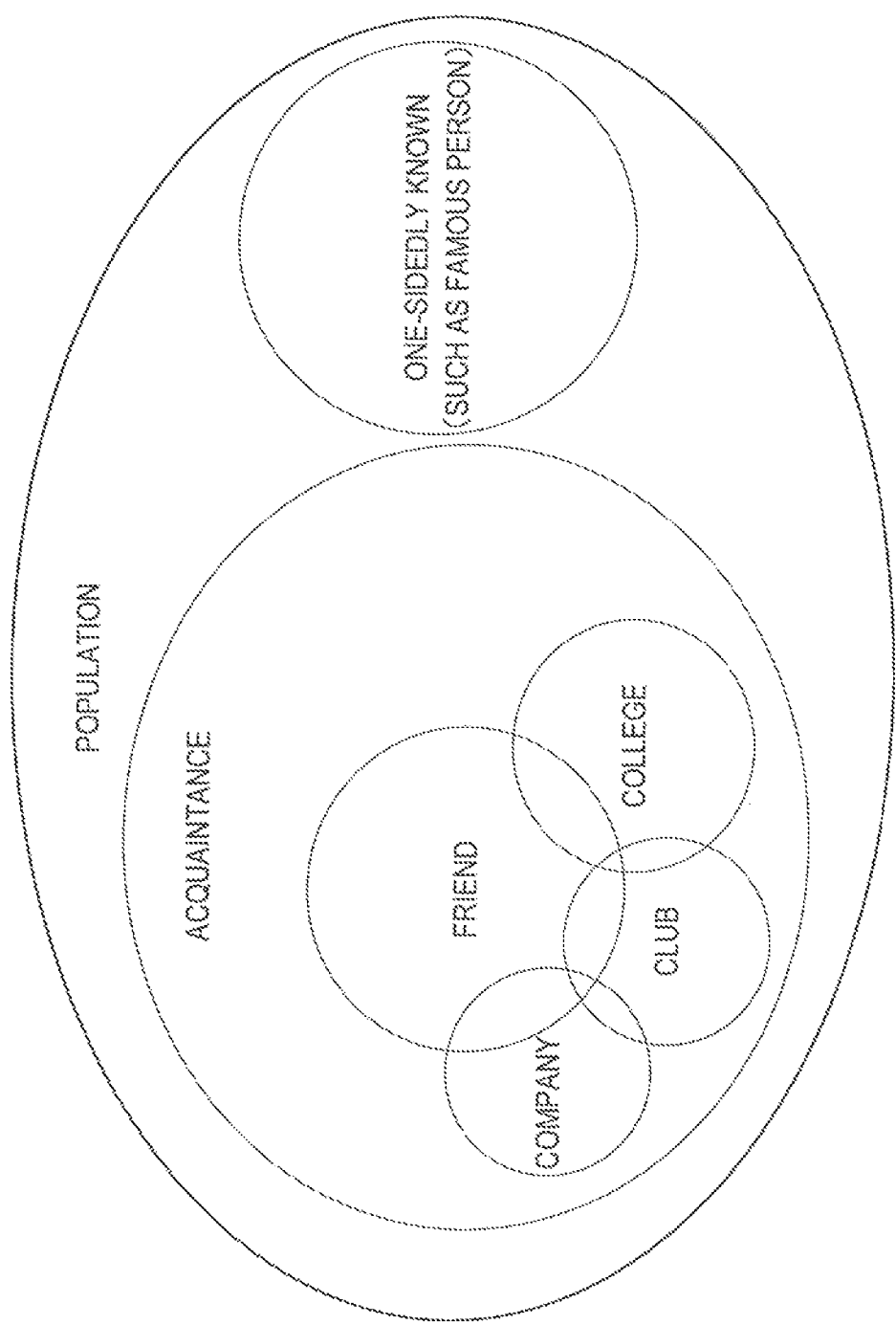
FIG. 1 is a schematic diagram showing a concept of a personal social network in a system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be set forth in the order as follows.
1. Overview of the embodiment
2. System configuration of the embodiment
3. Exemplary system configuration
4. Exemplary process of service providing server
5. Evaluation input through user terminal
6. Exemplary process of system
7 Formation of population
8. Calculation of degree of friendship/degree of acquaintanceship/degree of follow-up
9. Specific example of user evaluation
10. Specific example of recommendation method

[1. Overview of the Embodiment]

At first, with reference to FIG. 1, a schematic configuration of a system according to a first embodiment of the present disclosure will now be described. FIG. 1 is a schematic diagram showing a concept of a personal social network in a system according to the embodiment.

As illustrated in FIG. 1, population to which a person (referred to "user U" herein) belongs includes groups such as "acquaintance", "friend", "company", "club", "college", and "one-sidedly known".

FIG. 2 is a schematic diagram showing an exemplary data configuration of a social graph for each user belonging to groups illustrated in FIG. 1. The user A shown in FIG. 2 belongs to a group of "friend" in FIG. 1; the user B belongs to a group of "one-sidedly known"; and the user X belongs to a group of "company".

As illustrated in FIG. 2, the degrees of friendship, acquaintanceship, and follow-up are set for each of the users. Population flag is set to "1" for users belonging to the population and set to "0" for users not belonging to the population.

In an example illustrated in FIG. 2, the user A is a friend of the user U and following him/her. The user B is a famous person. The user U is only following Twitter. The user X is a company colleague and also friend of the user U. In this case, the degrees of friendship, acquaintanceship, and follow-up of the user A are set to "8", "0", and "2", respectively. Also, the degrees of friendship, acquaintanceship, and follow-up of the user B are set to "0", "0", and "7", respectively. Finally, the degrees of friendship, acquaintanceship, and follow-up of the user X are set to "3", "6", and "0", respectively. Since all of the user A, B, and X are belonging to the population of FIG. 11, the population flag is set to "1".

An evaluation score for a recommender represents an evaluation score of each user who has recommended content pieces such as item, music, or movie. In an example illustrated in FIG. 2, the evaluation scores of the user A, user B, and user X are 1.0, 0.2, and 0.7, respectively.

The user A has relatively higher evaluation score, so content pieces such as item, music, or movie the user A has recommended are likely to be in accordance with the preference of the user U. Thus, user can obtain content according to the user A's evaluation score so that the obtained content is relatively satisfactory to the user U. Also, the user U may give an evaluation score to the user A after obtaining the content according to the user A's evaluation score. If the obtained content pieces are satisfactory, then the user A's evaluation score become much higher, On the other hand, the user B has relatively lower evaluation score of 0.2, so the satisfaction level for the case where the user U obtains content according to the recommendation by the user B might be lower than by the user A.

Each of the users A, B, and X etc, belonging to the population has content information to be recommended for a genre such as music, movie, or various other items. An evaluation score is provided for a user for each genre. On recommending content for the user U, according to the evaluation score of the genre of the content, content pieces recommended by users having higher evaluation score are preferentially recommended. Thus, the system of the embodiment allows the user U to accurately obtain preferable content pieces by recommending them based on each user that is given an evaluation score.

[2. System Configuration of the Embodiment]

FIG. 3 is a schematic diagram showing a system configuration according to the embodiment. As illustrated in FIG. 3, a system 1000 of the embodiment includes a content providing server 100, a population forming server (SNS server) 200, and a user terminal 300. The content providing server 100 provides content pieces for the user terminal 300 and may provide recommender lists for the user terminal 300. Further, the content providing server 100 requests recommender information from the population forming server 200.

The user terminal 300 is an apparatus such as personal computer (PC), smart phone, or the like. The user terminal 300 obtains content and/or recommender lists from the content providing server 100. Also, the user terminal 300 sends recommender evaluation information (evaluation score described above) to the content providing server 100.

The population forming server 200, which is a server for forming population of multiple users, includes a SNS server for managing social network, as an example. The SNS server as an example of the population forming server 200 provides content recommender information to the content providing server 100 where the population includes users associated with the user U among those registered within the social network. The SNS server configures the population as users associated with the user U among those registered within the social network based on friend relationship or acquaintance relationship, etc.

The system 1000 described above allows the content providing server 100 to provide optimum content to the user terminal 300 based on recommender information obtained from the population forming server 200. Its mechanism will be described in detail below.

[3. Exemplary System Configuration]

Figure 4:
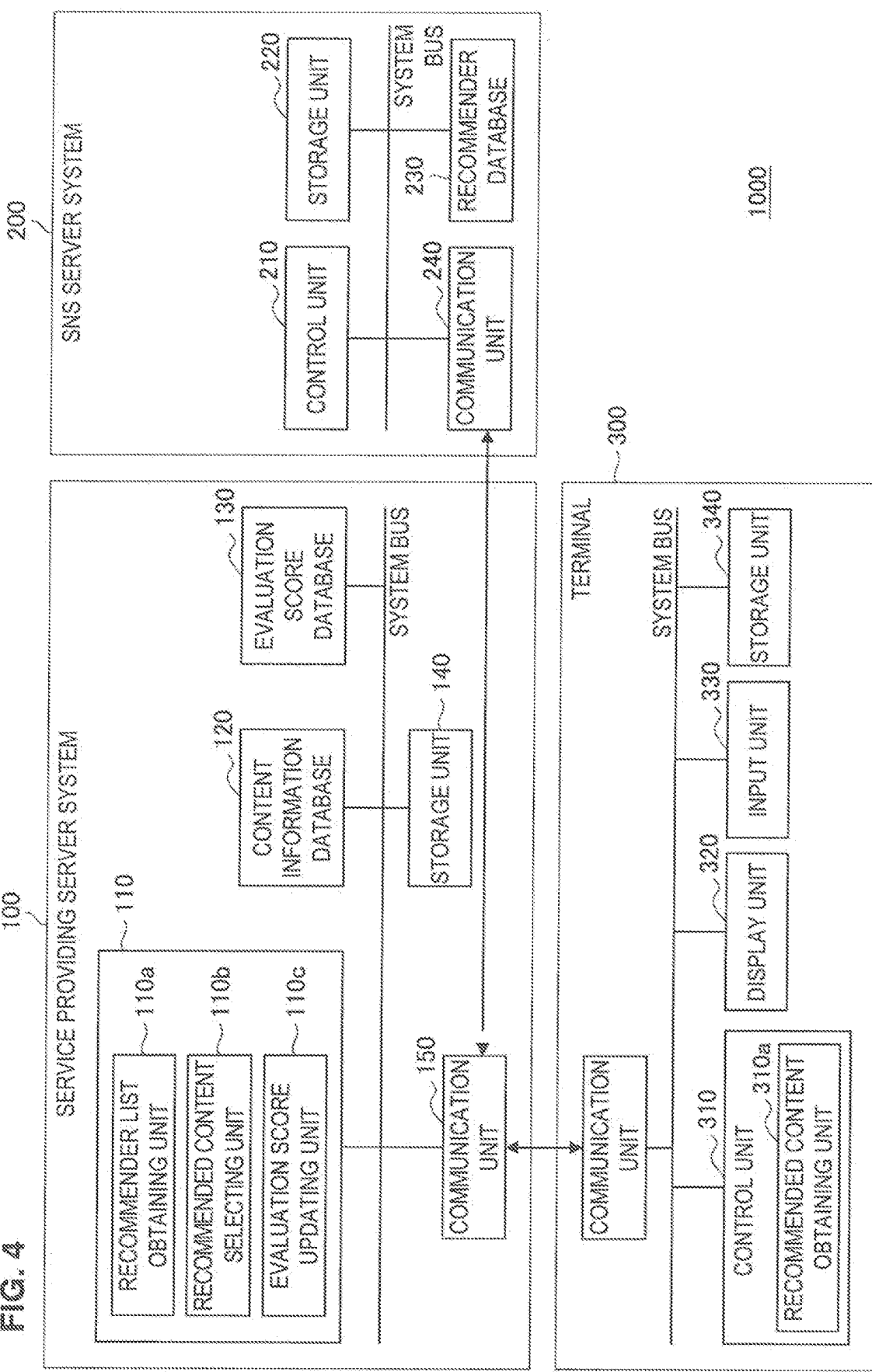
FIG. 4 is a block diagram showing a configuration of a system.

FIG. 4 is a block diagram showing a configuration of the system 1000. As illustrated in FIG. 4, the content providing server 100 has a control unit 110, a content information database (DB) 120, an evaluation score database (DB) 130, a storage unit 140 and a communication unit 150.

The population forming server 200 has a control unit 210, a storage unit 220, a recommender database (DB) 230, and a communication unit 240. The recommender database 230 stores recommender information such as illustrated in FIG. 2.

The user terminal 300 has a communication unit 302, a control unit 310, a display unit 320, an input unit 330, and a storage unit 340. The display unit 320 may include a liquid crystal display (LCD). The input unit 330 is a user interface such as keyboard or mouse.

The control unit 110 of the content providing server 100 has a recommender list obtaining unit 110a, a recommended content selecting unit 110b, and an evaluation score updating unit 110c. The recommender list obtaining unit 110a obtains recommender information (recommender list) from the recommender database 230 of the population forming server 200. The recommender list obtaining unit 110a may also create the recommender information based on information received from the population forming server 200. The recommended content selecting unit 110b selects recommended content based on the recommender list. The evaluation score updating unit 110c updates evaluation scores of the recommender list based on those associated with recommended content pieces received from a user terminal. Additionally, the communication unit 302 of the user terminal 300 sends a request for desired content to the content providing server 100. Also, the communication unit 302 sends an evaluation score about the recommended content according to the user input. A recommended content obtaining unit 310a of the control unit 310 obtains recommended content selected based on the recommender list and content list from the content providing server 100. The display unit 320 displays the recommended content based on an instruction from the control unit 310. The display unit 320 may also display the recommender information as well as the recommended content.

Note that each component of the content providing server 100, the population forming server 200, and the user terminal 300 illustrated in FIG. 4 may include a circuit (hardware) or, a central processing device such as CPU and a program (software) for causing the central processing device to operate. In this case, the program may be stored in a memory provided in each device, or storage medium inserted from outside of the device.

[4. Exemplary Process of Service Providing Server]

Figure 5:
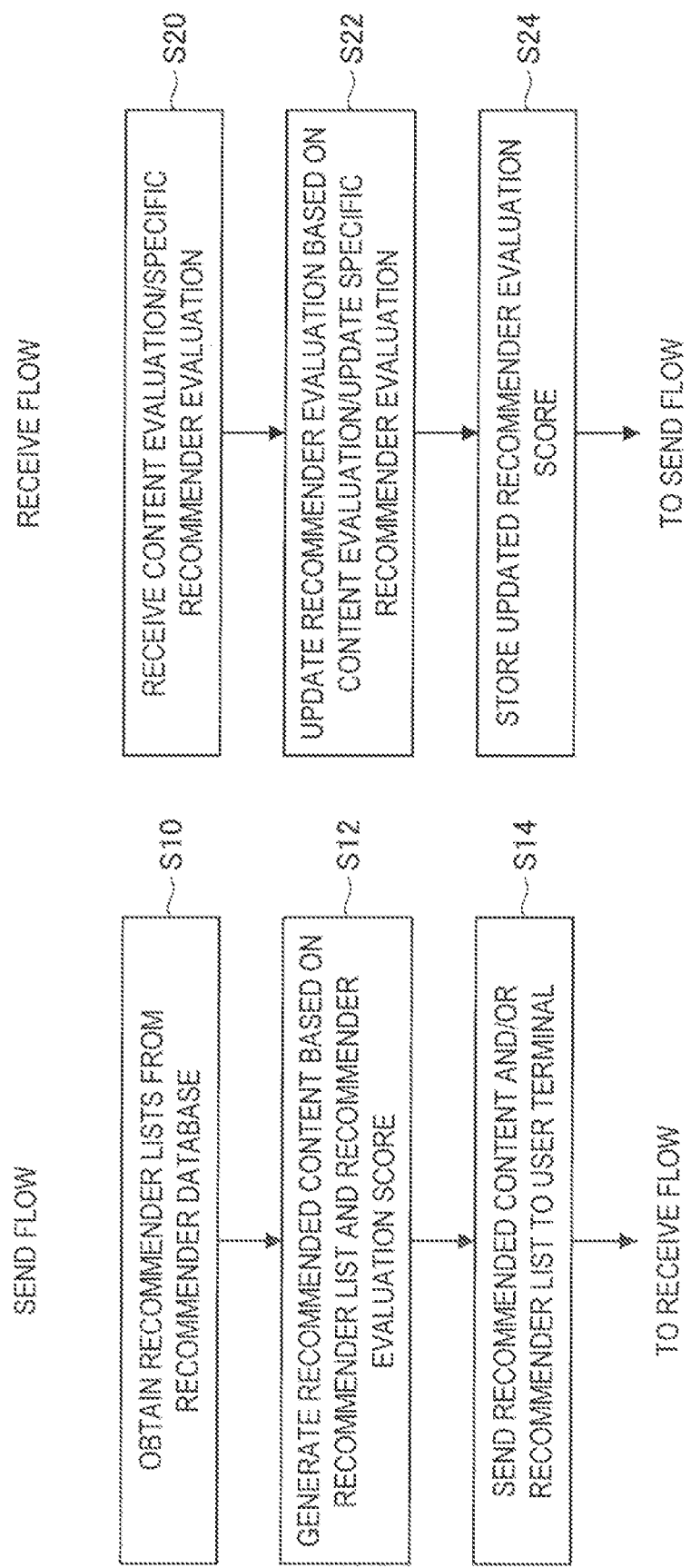
FIG. 5 is a flow chart showing a process of a service providing server.

FIG. 5 is a flow chart showing a process of a service providing server 100. As illustrated in FIG. 5, the service providing server 100 performs operations based on a send/receive flow. For the send flow, recommender information (recommender list) is obtained from the recommender database 230 of the population forming server 200 at the step S10. Recommended content pieces are then created (selected) based on the recommended list and recommender evaluation score at the step S12. Note that candidate content pieces for the recommended content pieces are stored in the content information database 120. Also, the service providing server 100 may obtain the candidate content pieces for the recommended content pieces from other servers. The recommended content pieces and/or recommender list are sent to the user terminal 300 at the next step S14. After the step S14, the flow proceeds to the step S20 of the receive flow.

As described above, the recommender information (recommender list) is a list illustrated in FIG. 2 as an example and formed by the population forming server 200. Content information recommended by each user as well as the information illustrated in FIG. 2 is included in the recommender information. Also, in the recommender information, an evaluation score is provided per genre of the content. The population forming server 200 forms population according to relationship of user preference, affiliation, or friendship and creates a recommender list about the users belonging to the population. The formation of the population by the population forming server 200 will be described below. Alternatively, the recommender list may be created by the content providing server 200 that receives basic information about the population from the population forming server

200. In particular, the content providing server 200 may create a recommender evaluation score list per genre based on the information about the population received from the population forming server.

FIG. 6 is a schematic diagram showing an example of listing of recommender evaluation scores per genre. FIG. 6 illustrates a recommender evaluation score of each user A, B, and X about genres of "movie" and "music", For example, the user A has an evaluation score of 1.0 for the genre of movie, whereas he/she has that of 0 for the genre of music. Therefore, for the user A, movies in line with the user U's preference may be recommended for the genre of movie, while music in line with the user U's preference may not necessarily be recommended for the genre of music.

The evaluation score database 130 of the content providing server 100 stores the recommender evaluation score list illustrated in FIG. 6. When an evaluation score about a provided content is sent from the user terminal 300, the content providing server 100 updates fields of the evaluation score database 130.

At the step S12 in FIG. 5, based on the recommender evaluation score list, recommended content may be created for each genre into which content requested by a user fall. Here, as an example, the recommended content is created in two ways described below.

The first way is to subject the users listed in the recommender evaluation score list to screening with a threshold of the evaluation score. In this case, based on the evaluation score, users are targeted as recommenders whose evaluation score exceeds a predefined threshold. The targeted recommenders' favorite content information is then aggregated to spec content with highest recommendation evaluation score as the recommended content. For example, for a movie genre, users whose evaluation scores exceed the predefined threshold are selected as recommenders from a recommender evaluation score list of "movie" illustrated in FIG. 6. Among content pieces recommended by the targeted recommenders, "movie A" that the most recommenders have recommended is then set, to be a recommended content. Alternately, if a user desires to use or view or listen unusual content, content with least recommender may also be a recommended content.

The second way is to subject recommended content to screening by weighting based on evaluation scores of recommenders. In this case, weighted evaluation scores are calculated by multiplying recommender's evaluation scores for the recommender's favorite content pieces. Content with highest weighted evaluation score is then specified as the recommended content. In this case, as in described above, content with least weighted evaluation score may also be specified as a recommended content.

In a receive flow of FIG. 5, at the step S20, the evaluation of content is received from the user terminal 300, Also, at the step S20, a specific recommender evaluation is received from the user terminal 300. At the next step S22, the evaluation of the recommender is updated based on the content evaluation. Users who viewed or listened and used the recommended content input the evaluation through the input unit 330 of the user terminal 300, and the evaluation is then sent to the content providing server 100 from the user terminal 300. Also, at the step S22, based on the evaluation of the specific recommender, update of the evaluation is performed. At the step S24, the updated recommender evaluation score is stored. After the step S24, the flow proceeds to the step S10 of the send flow.

[5. Evaluation Input Through User Terminal]

In this embodiment, there are mainly two ways described below for evaluation that users input through the user terminal 300.

1. Evaluation of Content

Users input the evaluation of content provided by the service providing server 100. In this case, an evaluation score given to the content is equally divided to all recommenders. For example, if the evaluation score is 5.0 and there are 5 recommenders, an evaluation score of 1.0 is equally given to each of the recommenders, thereby increasing an evaluation score of each recommender by 1.0.

Also, imbalanced allocation to all recommenders may be performed for the evaluation score given to content. For example, allocation of an evaluation score given to content may be performed in an imbalanced manner based on "the degree of friendship" in FIG. 2 such that a higher evaluation score is given to a user having higher degree of friendship.

2. A Case where Evaluation is Done for a Recommender

When a recommender list is sent to the user terminal 300 at the step S14 of FIG. 5, a user may evaluate each user listed in the recommender list. Therefore, the user may increase or decrease the evaluation score of each recommender by inputting an evaluation score through the user terminal 300.

Also, when each recommender is given an evaluation score, the content providing server 100 may simultaneously modify the evaluation of users having close relationship (higher degree of friendship) with the recommender.

Note that, although a recommender evaluation score list is separately provided in each genre (category) in FIG. 6, a list created for a category may be utilized for other categories. For example, a recommended content of "movie" may be created based on the preference of recommenders in the recommender evaluation sore list of "music".

Alternatively, the degree of content friendship (an evaluation score per content genre) may be reflected in the degree of friendship/the degree of acquaintanceship/the degree of follow-up on a SNS without no change.

[6. Exemplary Process of System]

Figure 7:
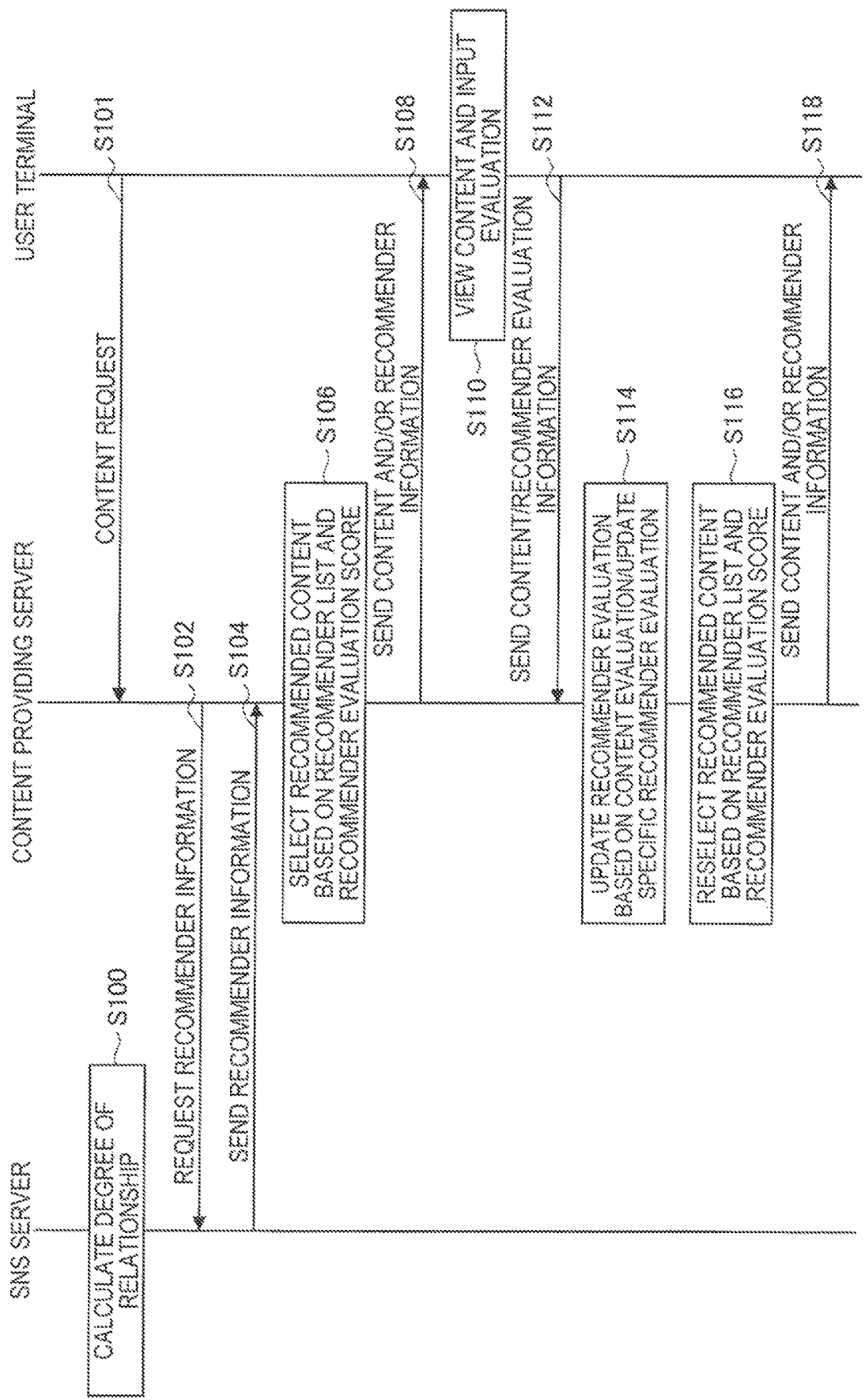
FIG. 7 is a sequence diagram showing a process of a system.

FIG. 7 is a sequence diagram showing a process of a system 1000. First, at the step S100, the population forming server 200 calculates the degree of relationship. At the next step S101, the user terminal 300 requests content from the content providing server 100. At the next step S102, the content providing server 100 requests recommender information from the population forming server 200. At the next step S104, the population forming server 200 sends recommender information to the content providing server 100. At the step S106, the content providing server 100 selects recommended content based on a recommender list and recommender evaluation score.

At the next step S108, the content providing server 100 sends content and/or recommender information to the user terminal 300. At the next step S110, a user views or listens the content using the user terminal 300. Further, at the step S110, after having viewed or listened the content, the user inputs the evaluation of the content to the user terminal 300.

At the next step S112, the user terminal 300 sends the content/recommender evaluation information to the content providing server 100. At the next step S114, the content providing server 100 updates the recommender evaluation based on the evaluation of the content and also updates the evaluation of a specific recommender, At the next step S116, the content providing server 100 reselects recommended content based on a recommender list and recommender evaluation score. At the next step S118, the content providing server 100 sends the content and/or recommender evaluation information to the user terminal 300.

[7. Formation of Population]

The formation of the population illustrated in FIG. 1 will now be described. The recommender database 230 in the population forming server 200 maintains information about a group (population) each user is belonging to. Each user does not necessarily belong to only one group and may belong to multiple groups. The population forming server 200 may calculate the degree of friendship from the groups to use it for content recommendation.

A specific example of the formation of the population will be described below. The control unit 210 of the population forming server 200 may form the population with characteristic information based on user behaviors listed in (1) to (4) below.

(1) Formation With Characteristic Information Based on User Behaviors

A population is formed by obtaining information of persons considering or having considered the purchase of similar items and by filtering and extracting the information with collaborative filtering to group the information.

A population is formed by obtaining information about a buying history via NFC (Near Field Communication Field) and grouping the information based on the information.

A population is formed by obtaining tags or comment information users attached to an item in a store and grouping the users based on the tags or comment information. In this case, the item may be recognized with AR (Augmented Reality) or NFC.

A population is formed by obtaining and grouping information about users purchasing at the same shop or online site.

A population is formed by obtaining and grouping information about users who have marked the same shop as favorites.

(2) Content Preference

A population is formed by grouping users having similar preference based on download history information of applications.

A population is formed by obtaining and grouping information about users using applications with the degree of similarity above a certain value.

A population is formed by obtaining and grouping information of users who have marked the same points in content. For example, the population may include users who have bookmarked the same pages in a digital book.

A population is formed by obtaining information of video recording tinier histories and grouping the histories in respect of the trend of favorite programs.

(3) Participation in Common Event

A population is formed by obtaining and grouping participant information per event (party, tour, etc.), where the participant information may be obtained using location information or ID authentication.

A population is formed by obtaining and grouping information of users going through the same motion at the same timing by way of motion sensing such as acceleration sensor or digital compass.

(4) Personal Character

User information categorized using FSS, psychological test, or fortune-telling by personal character is obtained to automatically generate a group.

A population is formed by obtaining and grouping information of outgoing people based on how many friends they have.

Above techniques allow the control unit 210 of the population forming server 200 to obtain various information to form population and generate social graph data illustrated in FIG. 2 for each user included in the population. When the population forming server 200 is an SNS server, the population may relatively easily be formed based on user's friendship.

[8. Calculation of Degree of Friendship/Degree of Acquaintanceship/Degree of Follow-Up]

The calculation of the degree of friendship/the degree of acquaintanceship/the degree of follow-up will now be described. The control unit 210 of the population forming server 200 may calculate the degree of friendship/the degree of acquaintanceship/the degree of follow-up. For example, a mechanism may be configured that obtains information of the time or number of communications (such as the number, hour, or time of the day of telephone, mail, or chatting) to increase the degrees of friendship and acquaintanceship. As an example of the time of the day, the degree of acquaintanceship may be increased for communications during office hours, whereas that of friendship may be increased communications during other hours. In particular, for communications during holidays, higher appreciation rate of the degree of friendship may be set. Also, if there are no communications (such as telephone, mail, or chatting) for long periods, the degree of friendship may be decreased.

Further, the type of mail address accounts (company email account or private email account) on communication may be obtained to modify the up-and-down of the degrees of friendship and acquaintanceship depending on the type of the account. For example, the degree of acquaintanceship may be increased for company email account, whereas that of friendship may be increased for private email account.

Alternately, the degree of friendship may be increased for a friend in a plurality of SNSs. For example, weighting may be modified according to whether the friend is just a friend, a follower, a friend in the Facebook, or a friend in the Path.

In addition, the degree of friendship of a user may be increased for a person who writes more for the user's posting or comment in an SNS, or the user's webpage. Further, the degree of followership may be increased for a person relating to a music or movie with many views and listens.

[9. Specific Example of User Evaluation]

A specific example of user evaluation will now be described. As described above, a user may input his/her evaluation through the user terminal 300 after using or viewing or listened content. The user may input his/her evaluation for provided content through the user terminal 300.

An example of evaluation for "content" is as follows:

Positive evaluation of for the content, "good"

Evaluation of including negative factors, "like/dislike"

Also, the user may input the following evaluations for "recommender" of the content through the user terminal 300.

Positive evaluation for a content recommender (such as "I like this recommender.")

Negative evaluation for a content recommender (such as "I dislike/exclude this recommender.")

Positive/negative evaluation based on properties such as age or sex

Evaluation such as ON/OFF or evaluation having intermediate values of ON/OFF

[10. Specific Example of Recommendation Method]

A specific example of recommendation method with the content providing server 100 will now be described. A music recommendation method depending on the degree of friendship will be described below.

Songs recommended by recommenders with higher degree of friendship are displayed on a content list screen of a music player application or a content player screen. On displaying the recommended songs, they may be displayed along with "recommendation information" described below.

An example of recommendation information: the user name of the recommender, the degree of friendship with the recommender (alternatively, the degree of friendship in a genre of content selected), the degree of acquaintance, the degree of followership, the name of group the recommender belongs to, recommendation comments of the recommender, whether the recommender is playing content at the same time, the time period the recommender has played content recently, w many times the recommender has played content.

The recommendation information may be displayed along with recommended songs that the user does not have, or only the recommendation information may be attached to songs the user has, for display. Recommenders who played the same songs recently may be displayed.

When a user buy songs he/she does not have, recommenders who have recommended the songs are notified of that fact. The display size of the recommender's name may be changed according to the relationship between the recommenders and the user.

By selecting the displayed recommender name, other content pieces recommender has recommended or the above recommendation information may be checked. The user may configure which recommender's recommended songs to be displayed based on the above recommendation information.

A recommender Mix may be automatically generated so that songs recommended by such a recommender automatically continue to be played in the order depending on the relationship with the recommender. Further, not only the degree of friendship alone, but a combination of the degrees of friendship, acquaintance, and followership may be used. Each of the degrees of friendship and acquaintance and/or followership may be set at or above a certain threshold.

Figure 8:
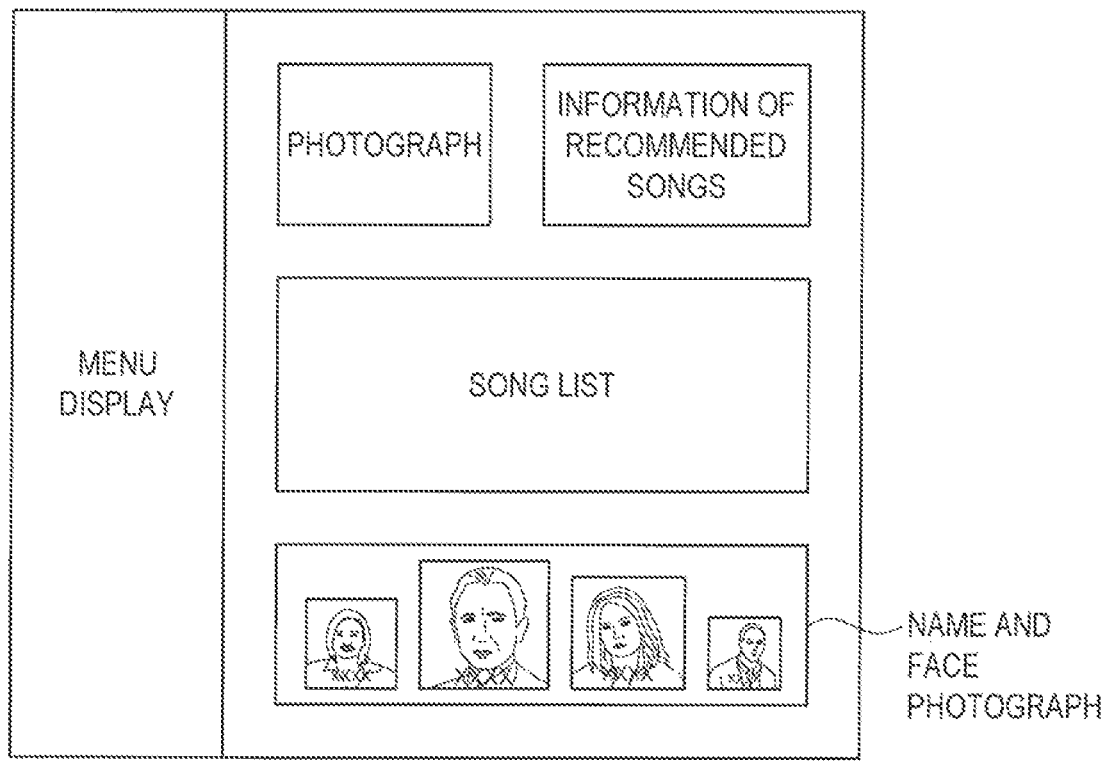
FIG. 8 is a schematic diagram showing a status of recommended songs being displayed on a display unit of a user terminal.

FIG. 8 is a schematic diagram showing a status of recommended songs being displayed on a screen of a display unit 320 of the user terminal 300. As illustrated in FIG. 8, a menu is displayed at the left side of the screen. Also, a jacket photograph and information (song name, artist name, etc.) of a recommended song currently played are displayed at the top of the screen. Further, a list of recommended songs is displayed at the center of the screen. The name and face photograph of the recommenders are displayed at the bottom of the screen. When there are multiple recommenders, their names and face photographs are displayed. Also, the name and face photograph may be displayed larger for recommenders with higher degree of friendship. Further, the names and face photographs of the multiple recommenders may be displayed such that they move horizontally according to the playing of the songs.

Other recommendation examples of content pieces provided by the content providing server 100 will now be described. The examples are as follows:

Recommend TV programs with an EPG of a TV
Recommend content at online stores such as Amazon
Automatically play content (music or motion picture) that a recommender recommends at a personal stream such as Ustream. Content pieces that recommenders recommend in real time are aggregated and the play order of songs is determined in view of the number of or the degree of friendship with the recommenders recommending content pieces.

A recommended event may be displayed on a scheduler such as Outlook. A register button is provided on the recommended event, which is added to the user's schedule when the button is pushed.

A recommended point may be displayed on a map. Only a recommended point of a recommender whose registered address is near the user may be displayed.

A recommended compiled news article may be displayed.

As described above, according to the embodiment, optimal content may be provided for a user based on an evaluation score of a recommender list generated for each genre.

It should be understood by those skilled in the art that various modifications, combinations, sub-combinations and alterations may occur depending on design requirements and other factors insofar as they are within the scope of the appended claims or the equivalents thereof.

(1) An information processing device including:
a recommender list obtaining unit obtaining a recommender list in which a recommender of content is associated with an evaluation score of the recommender for on a per-genre basis;
a recommended content selecting unit selecting recommended content based on the recommender list; and
a sending unit sending the recommended content.

(2) The information processing device according to (1), wherein the sending unit sends the recommender list along with the recommended content.

(3) The information processing device according to (1), further including:
a receiving unit receiving an evaluation score of the recommended content from a user having used the recommended content; and
an evaluation score updating unit updating the evaluation score of the recommender list based on the evaluation score.

(4) The information processing device according to (1), wherein the recommender list obtaining unit obtains the recommender list based on population information obtained from a population forming server forming a population, the information including content recommended by each user.

(5) The information processing device according to (4), wherein the population forming server is a social network server forming a population from acquaintance relationship between registered users.

(6) The information processing device according to (1), wherein the recommended content selecting unit selects the recommended content based on recommendation of a recommender having the evaluation score equal to or more than a predetermined threshold among recommenders listed in the recommender list.

(7) The information processing device according to (1), wherein the recommended content selecting unit selects the recommended content based on recommendation of a recommender weighted by the evaluation score of the recommender list.

(8) An information processing method, including:
obtaining a recommender list in which a recommender of content is associated with an evaluation score of the recommender on a per-genre basis;
selecting recommended content based on the recommender list; and sending the recommended content.

(9) A program for causing a computer to function as:
   a mechanism obtaining a recommender list in which a recommender of content is associated with an evaluation score of the recommender on a per-genre basis;
   a mechanism selecting recommended content based on the recommender list; and
   a mechanism sending the recommended content.
(10) An information processing system including:
   a content requesting terminal sending a content request;
   a population forming server forming a population and collecting information of users belonging to the population; and
   a content providing device including:
      a recommender list obtaining unit obtaining, from the population forming server, a recommender list in which a recommender of content is associated with an evaluation score of the recommender on a per-genre basis;
      a recommended content selecting unit selecting recommended content based on the content request received from the content requesting terminal and the recommender list: and
      a sending unit sending the recommended content to the content requesting terminal.
(11) The information processing system according to (10), wherein the content requesting terminal further includes a display unit displaying information of a recommender having recommended the recommended content along with the recommended content.
(12) The information processing system according to (11), wherein the display unit displays the information of the recommender in different ways depending on a degree of friendship.
(13) The information processing system according to (10), wherein the content providing device further includes:
   a receiving unit receiving an evaluation score of the recommended content from the content requesting terminal; and
   an evaluation score updating unit updating the evaluation score of the recommender list based on the evaluation score.
(14) An information processing method including:
   sending, by a content requesting terminal, a content request;
   forming, by a population forming server, a population and collecting, by the population forming server, information of users belonging to the population;
   obtaining, by a content providing device, from the population forming server, a recommender list in which a recommender of content is associated with an evaluation score of the recommender on a per-content genre basis;
   selecting, by the content providing device, a recommended content based on the content request and the recommender list; and
   sending, by the content providing device, the recommended content of the content requesting terminal.
(15) The information processing method according to (14), further including:
   receiving, by the content providing device, an evaluation score of the recommended content from the content requesting terminal; and
   updating, by the content providing device, the evaluation score of the recommender list based on the evaluation score.
(16) A content requesting terminal including:
   a sending unit sending a content request;
   a recommended content obtaining unit obtaining, from a content providing server, recommended content selected based on the content request and a recommender list in which a recommender of content is associated with an evaluation score of the recommender on a per-genre basis; and
   a display unit displaying the recommended content.
(17) The content requesting terminal according to (16), wherein the display unit displays information of a recommender having recommended the recommended content along with the recommended content.
(18) The content requesting terminal according to (16), further including an evaluation score sending unit sending an evaluation score associated with the recommended content.
(19) An information processing method including:
   sending a content request;
   obtaining, from a content providing server, recommended content selected based on the content request and a recommender list in which a recommender of content is associated with an evaluation score of the recommender on a per-genre basis; and
   displaying the recommended content.
(20) A program for causing a computer to function as:
   a mechanism sending a content request;
   a mechanism obtaining, from a content providing server, recommended content selected based on the content request and a recommender list in which a recommender of content is associated with an evaluation score of the recommender on a per-genre basis; and
   a mechanism displaying the recommended content.

The present disclosure contains subject matter related to that disclosed in Japanese Priority Patent Application JP 2012-128538 filed in the Japan Patent Office on Jun. 6, 2012, the entire content of which is hereby incorporated by reference.

What is claimed is:
1. An information processing device comprising:
   at least one processor configured to:
      obtain a recommender list for each genre of a plurality of genres, in which, for each genre of the plurality of genres, a recommender is associated with an evaluation score of the recommender, the evaluation score indicating a degree to which a respective genre, of the plurality of genres, of content recommended by the recommender is in accordance with a preference of a user;
      select recommended content based on the recommender list for a selected genre;
      initiate a sending of the recommended content;
      receive an evaluation score of the recommended content from the user having used the recommended content; and
      update the recommender list for the selected genre by updating, based on the received evaluation score, the evaluation score of the recommender associated with the selected recommended content, and evaluation scores of recommenders having a relationship with the recommender associated with the selected recommender content.
2. The information processing device according to claim 1, wherein the recommender list for the selected genre is sent along with the recommended content.
3. The information processing device according to claim 1, wherein the recommender list is obtained for each genre based on population information obtained from a population forming server forming a population, the population information including content recommended by each user.

4. The information processing device according to claim 3, wherein the population forming server is a social network server forming a population from acquaintance relationship between registered users.

5. The information processing device according to claim 1, wherein the recommended content is selected based on recommendation of a recommender having the evaluation score equal to or more than a predetermined threshold among recommenders listed in the recommender list for the selected genre.

6. The information processing device according to claim 1, wherein the recommended content is selected based on recommendation of a recommender weighted by a respectively associated evaluation score of the recommender list for the selected genre.

7. The information processing device according to claim 1, wherein the recommender list is utilized for identifying the recommended content, and the recommended content is sent to the user via a content requesting terminal.

8. The information processing device according to claim 1, wherein the recommender list is separately provided in each genre.

9. The information processing device according to claim 1, wherein for each genre of the plurality of genres, the recommender list is formed by associating a respective evaluation score to each respective recommender of a plurality of recommenders based on evaluation of the respective recommender in association with the respective genre, the evaluation score being associated with each respective recommender to represent a likelihood of the respective recommender having a similar preference or shared positive interest as that of the user for content pieces.

10. The information processing device according to claim 1, wherein the at least one processor is further configured to:
update the recommender list for the selected genre based on the received evaluation score so that evaluation scores of respective recommenders associated with the recommended content are updated,
wherein the evaluation scores of the respective recommenders associated with the recommended content are updated so that the received evaluation score is divided by a number of the recommenders associated with the recommended content and the divided evaluation score is equally given to each of the recommenders associated with the recommended content.

11. The information processing device according to claim 1, wherein the recommender list is updated for the selected genre by updating, based on the received evaluation score, the evaluation scores of recommenders having a degree of the relationship with the recommender associated with the selected recommender content that is greater than a predetermined degree.

12. An information processing method implemented by a processor of a computer, the method comprising:
obtaining a recommender list for each genre of a plurality of genres, in which, for each genre of the plurality of genres, a recommender is associated with an evaluation score of the recommender, the evaluation score indicating a degree to which a respective genre, of the plurality of genres, of content recommended by the recommender is in accordance with a preference of a user;
selecting recommended content based on the recommender list for a selected genre;
sending the recommended content;
receiving an evaluation score of the recommended content from the user having used the recommended content; and
updating the recommender list for the selected genre by updating, based on the received evaluation score, the evaluation score of the recommender associated with the selected recommended content, and evaluation scores of recommenders having a relationship with the recommender associated with the selected recommender content.

13. A non-transitory computer-readable medium having embodied thereon a program, which when executed by a computer causes the computer to execute a method, the method comprising:
obtaining a recommender list for each genre of a plurality of genres, in which, for each genre of the plurality of genres, a recommender is associated with an evaluation score of the recommender, the evaluation score indicating a degree to which a respective genre, of the plurality of genres, of content recommended by the recommender is in accordance with a preference of a user;
selecting recommended content based on the recommender list for a selected genre;
sending the recommended content;
receiving an evaluation score of the recommended content from the user having used the recommended content; and
updating the recommender list for the selected genre by updating, based on the received evaluation score, the evaluation score of the recommender associated with the selected recommended content, and evaluation scores of recommenders having a relationship with the recommender associated with the selected recommender content.

14. An information processing system comprising:
a content requesting terminal configured to send a content request;
a population forming server configured to form a population and collecting information of users belonging to the population; and
a content providing device including:
at least one processor configured to:
obtain, from the population forming server, a recommender list for each genre of a plurality of genres, in which, for each genre of the plurality of genres, a recommender is associated with an evaluation score of the recommender, the evaluation score indicating a degree to which a respective genre, of the plurality of genres, of content recommended by the recommender is in accordance with a preference of a user;
select recommended content based on the content request received from the content requesting terminal and the recommender list for a selected genre associated with the content request;
initiate a sending of the recommended content to the content requesting terminal;
receive an evaluation score of the recommended content from the user having used the recommended content; and
update the recommender list for the selected genre by updating, based on the received evaluation score, the evaluation score of the recommender in associated with the selected recommended content, and evaluation scores of recommenders having a relationship with the recommender associated with the selected recommender content.

15. The information processing system according to claim 14, wherein the content requesting terminal is further configured to initiate a displaying of information of a recommender having recommended the recommended content along with the recommended content.

16. The information processing system according to claim 15, wherein the information of the recommender is displayed in different ways depending on a degree of friendship.

17. An information processing method implemented by a processor of a computer, the method comprising:
sending, by a content requesting terminal, a content request;
forming, by a population forming server, a population and collecting, by the population forming server, information of users belonging to the population;
obtaining, by a content providing device, from the population forming server, a recommender list for each genre of a plurality of genres, in which, for each genre of the plurality of genres, a recommender is associated with an evaluation score of the recommender, the evaluation score indicating a degree to which a respective genre, of the plurality of genres, of content recommended by the recommender is in accordance with a preference of a user;
selecting, by the content providing device, a recommended content based on the content request and the recommender list for a selected genre associated with the content request;
sending, by the content providing device, the recommended content to the content requesting terminal;
receiving, by the content providing device, an evaluation score of the recommended content from the user having used the recommended content; and
updating, by the content providing device, the recommender list for the selected genre by updating, based on the received evaluation score, the evaluation score of the recommender in association with the selected genre, and evaluation scores of recommenders having a relationship with the recommender associated with the selected recommender content.

18. A content requesting terminal comprising:
at least one processor configured to:
initiate a sending of a content request;
obtain, from a content providing server, recommended content selected based on the content request and a recommender list for a selected genre in which a recommender is associated with an evaluation score of the recommender, the evaluation score indicating a degree to which a respective genre, of the plurality of genres, of content recommended by the recommender is in accordance with a preference of a user;
initiate a displaying of the recommended content;
receive an evaluation score of the recommended content from the user having used the recommended content;
initiate a sending of the evaluation score of the recommended content; and
obtain, from the content providing server, the recommender list for the selected genre updated by updating, based on the received evaluation score, the evaluation score of the recommender associated with the selected recommended content, and evaluation scores of recommenders having a relationship with the recommender associated with the selected recommender content.

19. The content requesting terminal according to claim 18, wherein information of a recommender having recommended the recommended content is displayed along with the recommended content.

20. The content requesting terminal according to claim 18, wherein the at least one processor is further configured to:
initiate a sending of an evaluation score associated with the recommended content.

21. An information processing method implemented by a processor of a computer, the method comprising:
sending a content request;
obtaining, from a content providing server, recommended content selected based on the content request and a recommender list for a selected genre in which a recommender is associated with an evaluation score of the recommender, the evaluation score indicating a degree to which a respective genre, of the plurality of genres, of content recommended by the recommender is in accordance with a preference of a user;
displaying the recommended content;
receiving an evaluation score of the recommended content from the user having used the recommended content;
initiating a sending of the evaluation score of the recommended content; and
obtaining, from the content providing server, the recommender list for the selected genre updated by updating, based on the received evaluation score, the evaluation score of the recommender associated with the selected recommended content, and evaluation scores of recommenders having a relationship with the recommender associated with the selected recommender content.

22. A non-transitory computer-readable medium having embodied thereon a program, which when executed by a computer causes the computer to execute a method, the method comprising:
sending a content request;
obtaining, from a content providing server, recommended content selected based on the content request and a recommender list for a selected genre in which a recommender is associated with an evaluation score of the recommender, the evaluation score indicating a degree to which a respective genre, of the plurality of genres, of content recommended by the recommender is in accordance with a preference of a user;
displaying the recommended content;
receiving an evaluation score of the recommended content from the user having used the recommended content;
initiating a sending of the evaluation score of the recommended content; and
obtaining, from the content providing server, the recommender list for the selected genre updated by updating, based on the received evaluation score, the evaluation score of the recommender associated with the selected recommended content, and evaluation scores of recommenders having a relationship with the recommender associated with the selected recommender content.

* * * * *